United States Patent
Ichihara et al.

(10) Patent No.: US 10,450,735 B2
(45) Date of Patent: Oct. 22, 2019

(54) FLUSH TOILET

(71) Applicant: LIXIL Corporation, Tokyo (JP)

(72) Inventors: Saori Ichihara, Tokyo (JP); Isato Hirasawa, Tokyo (JP); Tomoya Sasaki, Tokyo (JP); Takeya Ichiyanagi, Tokyo (JP); Makoto Saruta, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 16/069,501

(22) PCT Filed: Jan. 6, 2017

(86) PCT No.: PCT/JP2017/000268
§ 371 (c)(1),
(2) Date: Jul. 11, 2018

(87) PCT Pub. No.: WO2017/122591
PCT Pub. Date: Jul. 20, 2017

(65) Prior Publication Data
US 2019/0032319 A1    Jan. 31, 2019

(30) Foreign Application Priority Data

Jan. 15, 2016 (JP) ................................. 2016-006611

(51) Int. Cl.
*E03D 11/02* (2006.01)
*E03D 9/08* (2006.01)

(52) U.S. Cl.
CPC ................ *E03D 11/02* (2013.01); *E03D 9/08* (2013.01); *Y02A 10/34* (2018.01)

(58) Field of Classification Search
CPC ...................................... E03D 11/02
USPC .............................................. 4/427
See application file for complete search history.

(56) References Cited

U.S. PATENT DOCUMENTS 3,925,826 A    12/1975   Huyot et al.

FOREIGN PATENT DOCUMENTS

| EP | 2080465 | 7/2009 |
|----|---------|--------|
| GB | 2102464 | 2/1983 |
| JP | 5-14279 | 2/1993 |
| JP | 5-87076 | 11/1993 |
| JP | 2011-140833 | 7/2011 |
| JP | 2014-95234 | 5/2014 |

*Primary Examiner* — Lori L Baker
(74) *Attorney, Agent, or Firm* — Morrison & Foerster LLP

(57) ABSTRACT

In a flush toilet, a base plate, in which a function unit is installed, is provided on a recessed portion formed on a rear upper surface of a toilet bowl of a toilet main body. Hole portions that are open downward are provided in the recessed portion. The base plate is provided with bottomed protrusion portions fitted into the hole portions and accommodates a part of the function unit. Flow channels are provided between the base plate and the recessed portion, so that water inside the toilet bowl is discharged to a floor surface from the flow channels from the hole portions before the water overflows.

7 Claims, 8 Drawing Sheets

FLUSH TOILET

REFERENCE TO RELATED APPLICATIONS

This application is a national stage application under 35 USC 371 of International Application No. PCT/JP2017/000268, filed Jan. 6, 2017, which claims the priority of Japanese Application No. 2016-006611, filed Jan. 15, 2016, the entire contents of each of which are incorporated herein by reference.

FIELD OF THE INVENTION

The present invention relates to a flush toilet in which cleaning water is prevented from overflowing from a toilet bowl due to a clogged trap pipeline or the like of the toilet bowl.

BACKGROUND OF THE INVENTION

In the related art, Patent Document 1 discloses a flush toilet that has been proposed as a device in which cleaning water is prevented from overflowing due to filth or the like clogged in a trap pipeline of a toilet bowl. In this flush toilet, an inflow port for a relief flow channel extending in a horizontal direction is installed in the vicinity of an upper end of a bowl portion connected to the trap pipeline, and a drain flow channel leading to another water pipe from an outflow port on the other end side thereof is connected. A water level sensing sensor is provided at a position lower than the outflow port inside the relief flow channel.

In a case where a water level of cleaning water supplied to the bowl portion rises due to clogging or the like of the trap pipeline, the water level sensing sensor senses the cleaning water flowing into the relief flow channel in the vicinity of the upper end of the bowl portion, and the cleaning water stops being supplied to the bowl portion. The water level sensing sensor prevents overflowing of water supplied to the inside of the bowl portion, that is, overflowing of water from the bowl portion.

Patent Document 1 Japanese Unexamined Patent Application, First Publication No. 2011-140833.

SUMMARY OF THE INVENTION

However, in the flush toilet disclosed in Patent Document 1, since a water level sensing sensor is installed in the vicinity of an upper end of a bowl portion, there is concern that before cleaning water stops being supplied in response to detection of a water level by the water level sensing sensor and the water level stops rising, waste water overflows from an upper portion of the bowl portion and a function unit of a private part cleaning device is flooded or submerged. In addition, if the water level sensing sensor malfunctions, overflowing cannot be prevented.

The present invention has been made in consideration of the foregoing problems, and an object thereof is to provide a flush toilet in which water is inhibited from overflowing from a toilet bowl so that a function unit can be prevented from being flooded or being submerged.

According to the present invention, a flush toilet include a toilet main body, a base portion which is provided on an upper surface of the toilet main body and in which a function unit is installed, and a flow channel which is provided between the toilet main body and the function unit and discharges water that overflows from a toilet bowl of the toilet main body.

According to the present invention, since the flow channel for discharging water inside the toilet bowl is formed between the toilet main body and the function unit, even in a case where a trap pipeline or the like of the toilet bowl is clogged, water that overflows from the toilet bowl can be drained through the flow channel. At this time, the function unit installed in the base portion can be prevented from being submerged or being contaminated.

In addition, the flow channel may be formed between the toilet main body and the base portion.

In this case, the function unit installed in the base portion can be prevented from being flooded.

In addition, the flow channel may be formed on the base portion and may communicate with the toilet main body via a flow channel opening formed in the base portion.

Even if water flows on the flow channel of the base portion from the toilet bowl, since the water can be drained to the toilet main body through the flow channel opening, flooding of the function unit on the base portion can be suppressed.

In addition, a recessed portion may be formed on the upper surface on which the base portion of the toilet main body is installed, and the flow channel may be formed in the recessed portion.

If the flow channel is formed in the recessed portion of the toilet main body, even in a case where the toilet bowl is clogged, water can be drained through the flow channel, so that the function unit installed in the base portion can be prevented from being flooded or being submerged.

In addition, a sensor detecting water may be installed in the flow channel of the recessed portion.

The sensor detects water that has flowed out from the toilet bowl to the flow channel of the recessed portion, so that water can stop being supplied to the toilet bowl.

In addition, the flow channel may communicate with a hole portion that is formed in the toilet main body and is open downward.

Water flowing in the flow channel can be drained below a floor surface or the like through the hole portion of the toilet main body.

In addition, the flow channel may communicate with a depression portion that is formed to protrude downward from the toilet main body, and a sensor detecting water may be installed in the depression portion.

If water flowing in the flow channel of the toilet main body is caused to fall into a bottom portion of the depression portion and to be stored therein, the sensor detects the water and water supply to the toilet bowl can be stopped.

In addition, an opening for draining water downward may be provided at a position lower than the function unit in height in the depression portion.

Even if a water level of water accumulated in the bottom portion of the depression portion rises beyond the sensor for some reason, water can be discharged from the opening before the function unit is flooded.

In the flush toilet according to the present invention, even in a case where the toilet bowl of the toilet main body is clogged, water supplied to the toilet bowl can be discharged from the flow channel between the toilet main body and the function unit, so that water does not overflow from the toilet bowl and the function unit provided in the base portion can be prevented from being flooded or being submerged.

DETAILED DESCRIPTION OF THE INVENTION

Hereinafter, a flush toilet including a private part cleaning device according to each of embodiments of the present invention will be described using the accompanying drawings.

FIGS. 1 to 5 show a flush toilet 1 according to a first embodiment of the present invention. In this specification, a wall surface side or a back surface side of a restroom space on which the flush toilet 1 is attached will be referred to as a rear portion or the rear, and the opposite side thereof (side on which a person stands when he discharges his urine) will be referred to as a front portion or the front.

Figure 1:
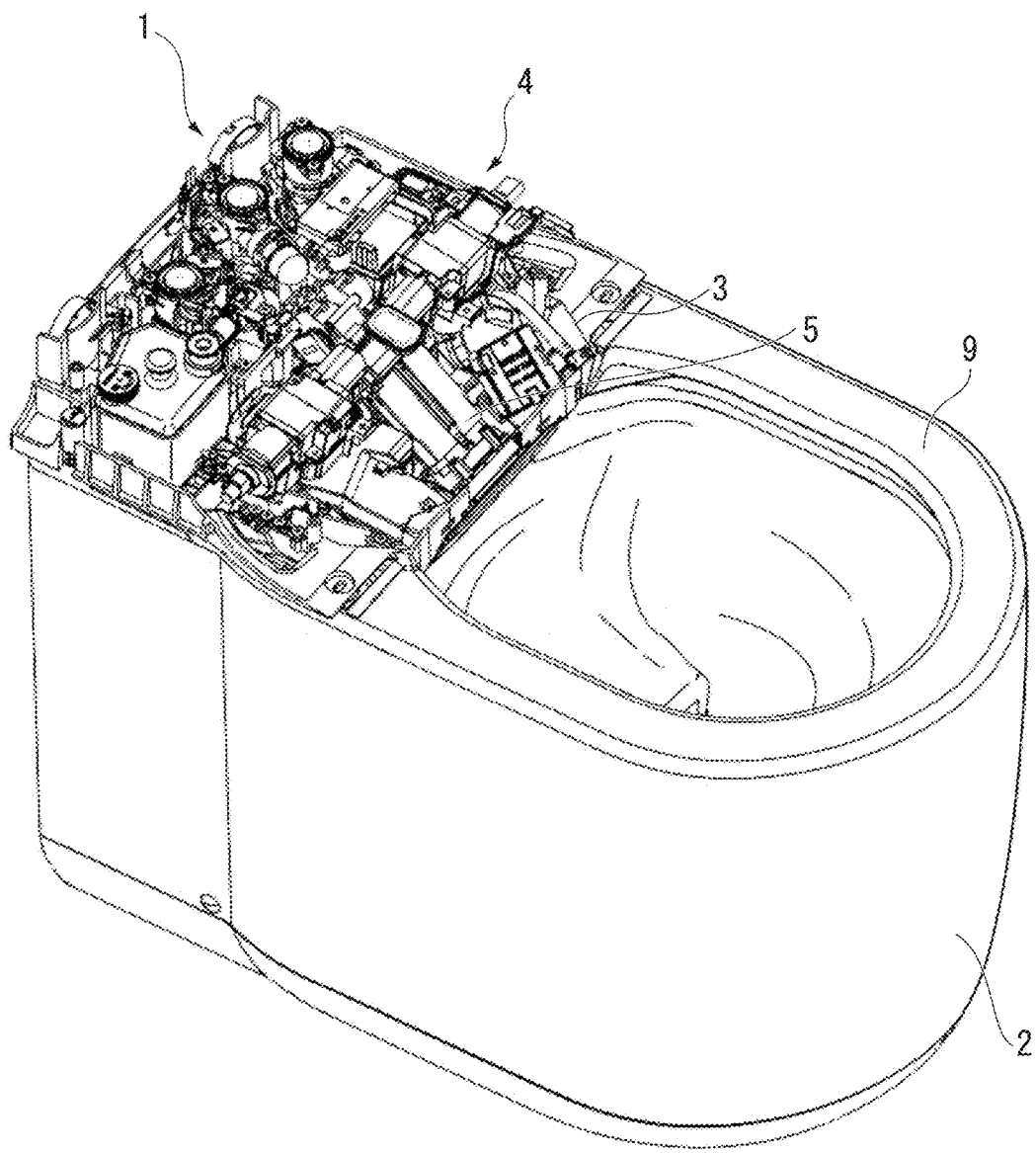
FIG. 1 is a perspective view of a main portion of a flush toilet according to a first embodiment of the present invention.

The flush toilet according to the first embodiment shown in FIG. 1 is a type being installed, for example, on a wall surface of the restroom space. A base plate 3 is fixed to the rear portion on an upper surface of a ceramic toilet main body 2, and a function unit 4 equipped with functional components for a private part cleaning device is installed on the base plate 3. Various functional components such as a cleaning nozzle 5, a cleaning water tank (not shown) heated by a heater, and electric components are installed in the function unit 4.

Figure 2:
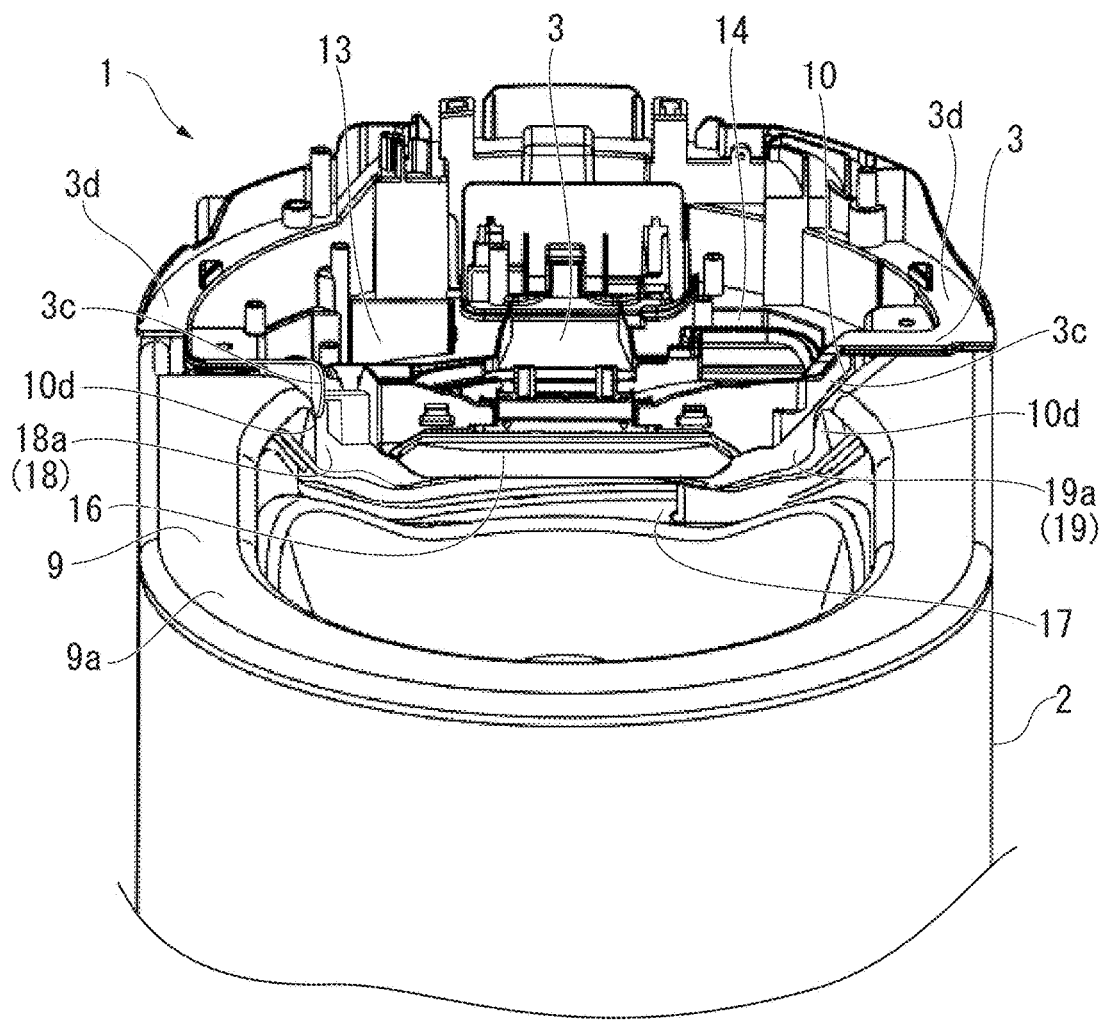
FIG. 2 is a perspective view of the main portion showing a toilet main body and a base plate of the flush toilet shown in FIG. 1.
Figure 3A:
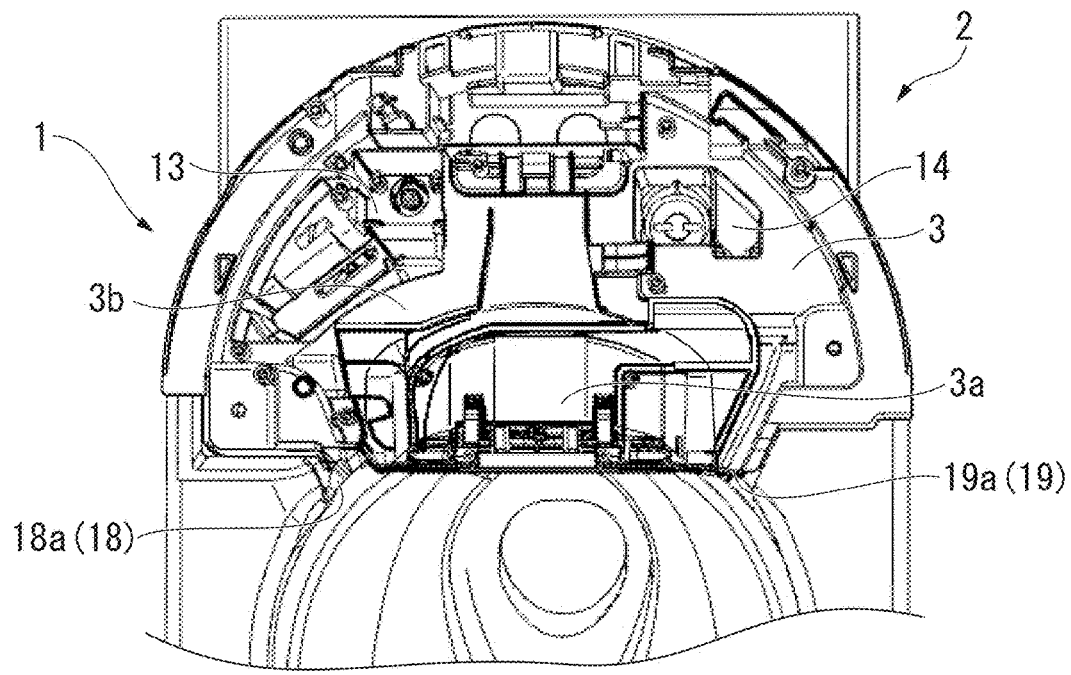
FIG. 3A is a plan view of the main portion in which the base plate is installed in a recessed portion of the toilet main body in FIG. 2.

FIGS. 2 and 3A show the base plate 3 provided at the rear of the toilet main body 2 on the upper surface of the toilet main body 2, and the function unit 4 installed on the base plate 3 is omitted. In FIG. 3A, in a state where the base plate 3 is fixed to a recessed portion 10 formed in the rear portion on the upper surface of the toilet main body 2, using a reverse nut or the like, the center of a front end portion of the base plate 3 facing a toilet bowl 9 is formed as a distal end low portion 3a which is formed to be lower than the periphery thereof, and a surrounding portion 3b on the periphery on the rear side thereof is formed to be high by one stage via a step. The cleaning nozzle 5 and the like are installed on the distal end low portion 3a, and protrusion portions 13 and 14 (which will be described below) are formed in the surrounding portion 3b.

Figure 3B:
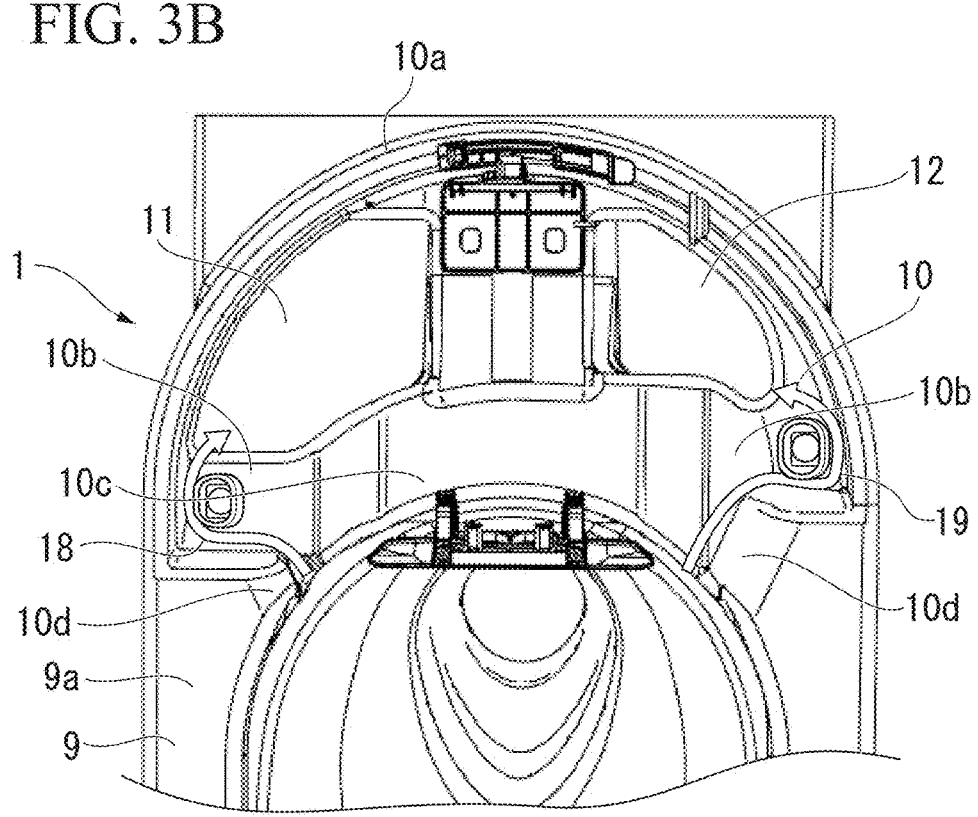
FIG. 3B is a view in which the base plate is removed from the recessed portion of the toilet main body in FIG. 2.

In the toilet main body 2 excluding the base plate 3 shown in FIG. 3B, an upper surface 9a of the toilet bowl 9 is provided above the toilet bowl 9 throughout the whole circumference. At the rear of the upper surface 9a, the recessed portion 10 having a substantially semicircular shape in a plane view is formed to be recessed by one stage with respect to the front and sides of the upper surface 9a (refer to FIG. 2). A substantially arc-shaped jetty portion 10a is formed as a partition in the rear portion of the recessed portion 10.

For example, two hole portions 11 and 12 which are open downward are formed inside the recessed portion 10 in a lateral direction. While having both side portions in the recessed portion 10 as upper stage portions 10b, a center portion is formed as a lower stage portion 10c between the hole portions 11 and 12 and a rear end of the toilet bowl 9 to be lower than the upper stage portion 10b in height by one stage via a tapered portion. The distal end low portion 3a of the base plate 3 is mounted on the lower stage portion 10c of the recessed portion 10.

Figure 4:
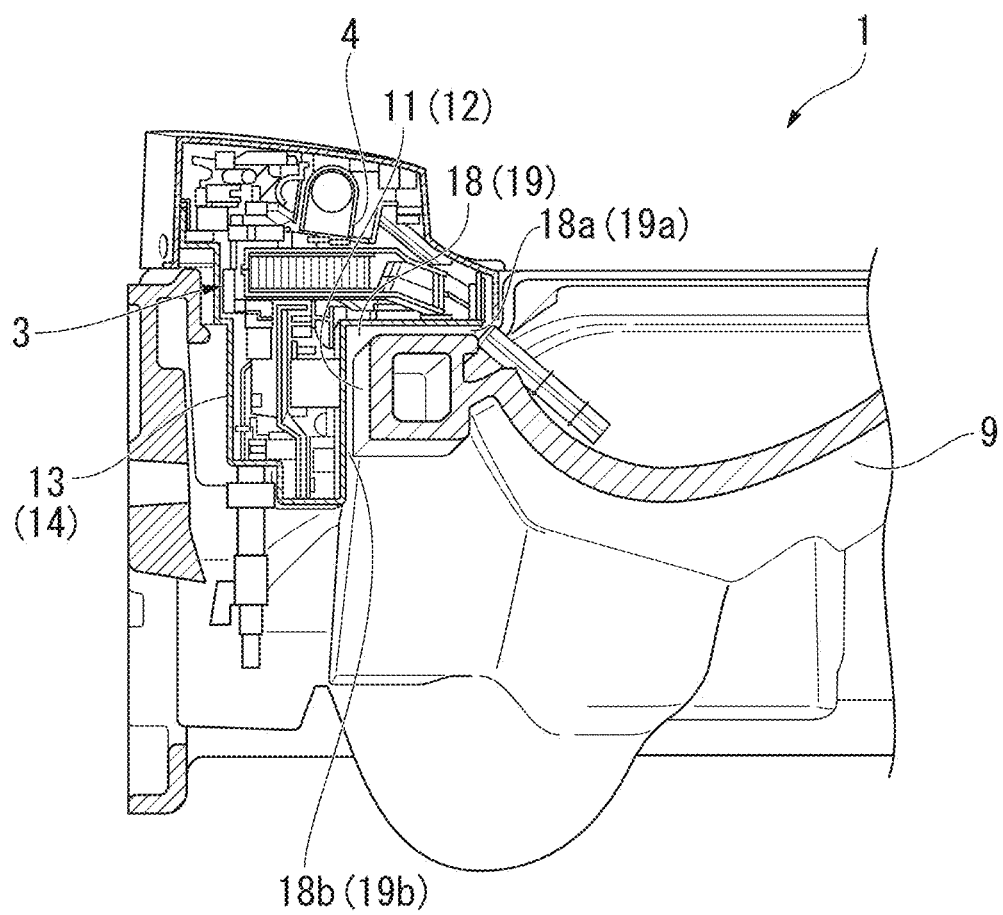
FIG. 4 is a longitudinal cross-sectional view of the main portion showing a flow channel through which water in a toilet bowl flows from the recessed portion of the toilet main body to a floor surface.

In FIGS. 2 to 4, in the surrounding portion 3b of the base plate 3, protrusion portions 13 and 14 to be fitted into the hole portions 11 and 12 of the recessed portion 10 are formed to protrude downward. The portions 13 and 14 are tubular and have a bottom. A part of components of the function unit 4 is accommodated inside the protrusion portions 13 and 14. Accordingly, the height of the function unit 4 can be set to be lower than that in the related art.

In FIG. 2, a plate 16 which covers the cleaning nozzle 5 facing the toilet bowl 9 is installed at the center on a front surface of the base plate 3. A water flow port 17 for supplying and dispensing cleaning water along a rim on a back side on the upper surface 9a of the toilet bowl 9 is open in an oblique direction on a surface of the toilet bowl 9 on a rear side. The recessed portion 10 is formed at a height position on an upper surface of the rim or the upper surface 9a of the toilet bowl 9.

Then, in a state where the base plate 3 is fixed inside the recessed portion 10 of the toilet main body 2 shown in FIG. 2, erection portions 3c are respectively formed on both side portions of the plate 16 in the front end portion of the base plate 3 facing the toilet bowl 9. A flange portion 3d mounted in the jetty portion 10a is formed at an upper end of each of the erection portions 3c. Inflow ports 18a and 19a of the pair of flow channels 18 and 19 for discharging water inside the toilet bowl 9 before overflowing are formed on the upper surfaces of the upper stage portion 10b and the lower stage portion 10c of the recessed portion 10, that is, between the erection portions 3c on both sides of the base plate 3 in a width direction and a front side wall 10d of the recessed portion 10.

In the center portion between the inflow ports 18a and 19a at both ends, a seal member (not shown) seals a space between the distal end low portion 3a of the base plate and the recessed portion 10. Since the cleaning nozzle 5 and electric components are intensively installed in a central part on the base plate 3, it is preferable to avoid installing the flow channels 18 and 19. In FIG. 3B, the flow channels 18 and 19 communicate with the hole portions 11 and 12 from the inflow ports 18a and 19a via the upper stage portion 10b of the recessed portion 10, and the hole portions 11 and 12 are open downward.

Figure 5:
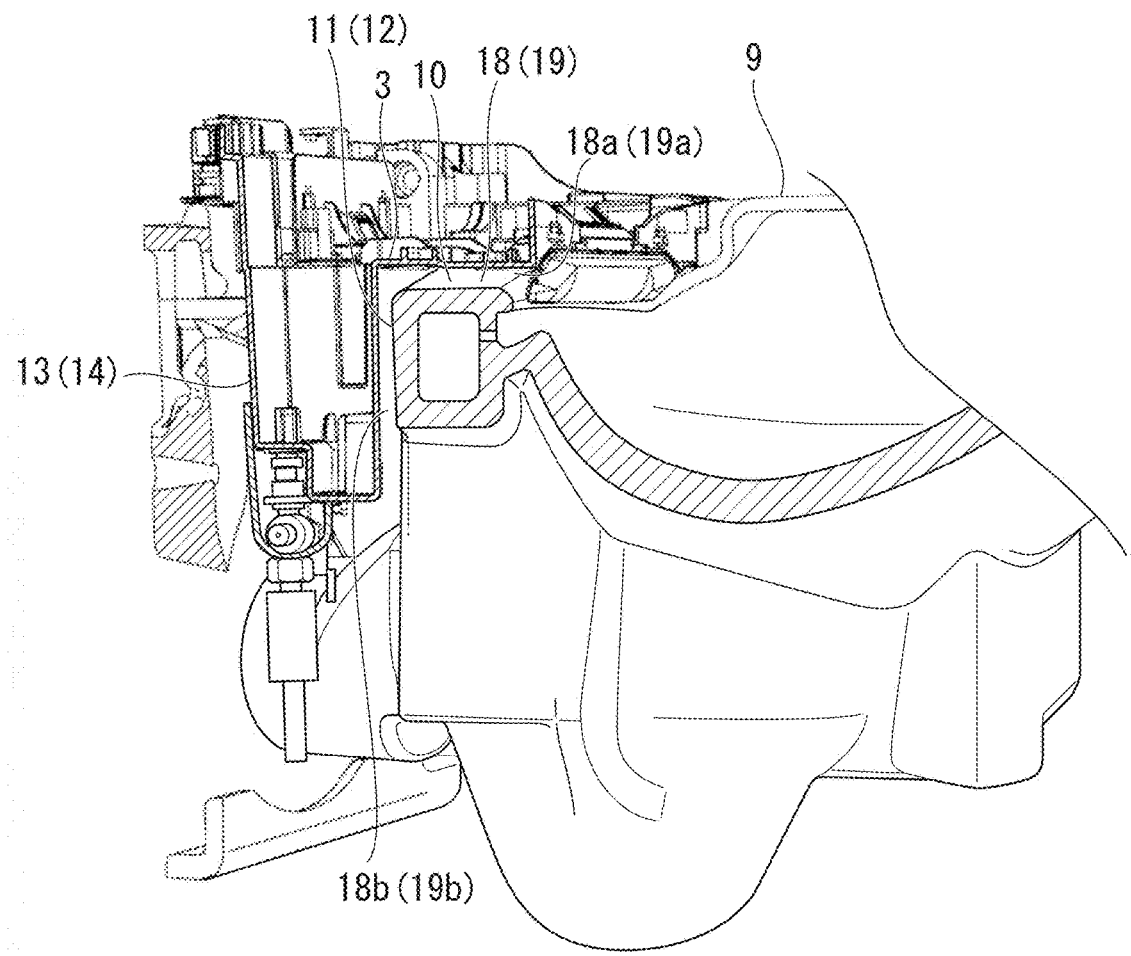
FIG. 5 is a view showing the main portion showing the flow channel between the recessed portion of the toilet main body and the base plate.

FIGS. 4 and 5 show the flow channel 18 (19) on one side. The flow channels 18 and 19 are formed through a gap with respect to the protrusion portions 13 and 14 of the base plate 3 inside the hole portions 11 and 12 and are open downward from the outflow ports 18b and 19b below thereof.

Therefore, in a case where the water level of water supplied to the inside of the toilet bowl 9 rises, overflowed water flows into the flow channels 18 and 19 from the inflow ports 18a and 19a between the toilet main body 2 and the base plate 3 and falls down to a floor surface from the outflow ports 18b and 19b at the rear on the upper surface 9a of the toilet bowl (the upper stage portion 10b, the lower stage portion 10c, or the like) before the water overflows from the front and the sides of the upper surface 9a of the toilet bowl 9 to the outer side of the toilet main body.

Water which has overflows from the toilet bowl 9 can flow in the upper stage portion 10b or the lower stage portion 10c of the recessed portion 10 other than the flow channels 18 and 19.

The flush toilet 1 according to the present embodiment includes the configuration as described above. Next, an operation thereof will be described. In a case where cleaning water is supplied to the inside of the toilet bowl 9 of the toilet main body 2 to discharge filth, if a trap pipeline of the toilet bowl 9 is clogged, the water level of the toilet bowl 9 rises. If the water level of the toilet bowl 9 reaches that in the vicinity of the upper surface of the rim on the upper surface 9a on a lower side, water (waste water) flows into the flow channels 18 and 19 from the inflow ports 18a and 19a between the erection portions 3c at both ends of the front end portion of the base plate 3 and the front side wall 10d of the recessed portion 10.

Then, water which has flowed into the flow channels 18 and 19 flows in the upper stage portion 10b of the recessed portion 10 and falls into the hole portions 11 and 12. The water thereby falls onto the floor surface in the restroom space from the outflow ports 18b and 19b through the gap between the hole portions 11 and 12 and the protrusion portions 13 and 14 of the base plate 3. Therefore, even if the trap pipeline is clogged and the water level inside the toilet bowl 9 rises, water does not overflow from the front and the sides of the upper surface 9a of the toilet bowl 9 to the outer side of the toilet main body 2.

A user or the like can find that the trap pipeline or the like of the toilet bowl 9 is clogged, by seeing water which has fallen onto the floor surface, so that the user can manually stop water. Moreover, the function unit 4 can be prevented from being flooded due to water inside the toilet bowl 9 flowing from the distal end low portion 3a of the base plate 3.

In addition, even if a user erroneously pours water or the like in a bucket into the toilet bowl 9 in order to discharge filth inside the toilet bowl 9 and the water level rises, the water can be similarly drained onto the floor surface through the flow channels 18 and 19. Therefore, the function unit 4 on the base plate 3 is not flooded due to water overflowing from the toilet bowl 9.

According to the flush toilet 1 according to the first embodiment as described above, a part of the function unit 4 is accommodated inside the protrusion portions 13 and 14 of the base plate 3 and is fitted into the hole portions 11 and 12 inside the recessed portion 10, and the base plate 3 is installed inside the recessed portion 10. Therefore, a product including the function unit 4 can be lowered in height and can be compactly formed.

Then, in a case where the toilet bowl 9, the trap pipeline thereof, or the like is clogged, even if the water level of water supplied to the inside of the toilet bowl 9 rises, water can be caused to fall onto the floor surface from the gap between the hole portions 11 and 12 and the protrusion portions 13 and 14 through the flow channels 18 and 19 from the inflow ports 18a and 19a between the toilet main body 2 and the base plate 3. Therefore, water is inhibited from flowing from the toilet bowl 9, so that the function unit 4 such as the electric components on the base plate 3 can be prevented from being flooded, being contaminated, or the like.

The flush toilet 1 according to the present invention is not limited to the first embodiment described above, and suitable changes, replacements, and the like can be made within a range not departing from the gist of the present invention. Hereinafter, another embodiment, a modification example, and the like of the present invention will be described. The same reference signs will be applied to components and members which are the same as or similar to those in the first embodiment described above, and description thereof will be omitted.

Figure 6:
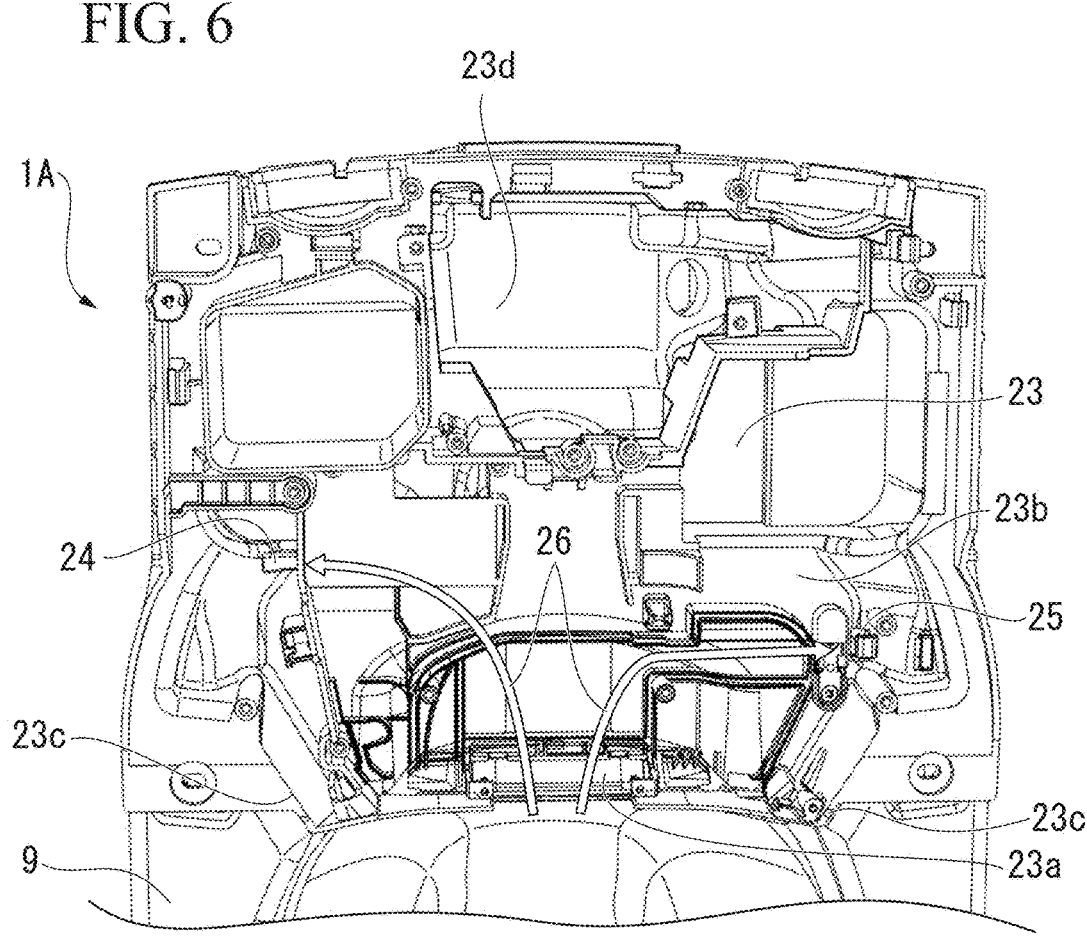
FIG. 6 is a plan view of a main portion showing a flow channel on a base plate provided in a toilet main body of a flush toilet according to a second embodiment.
Figure 7:
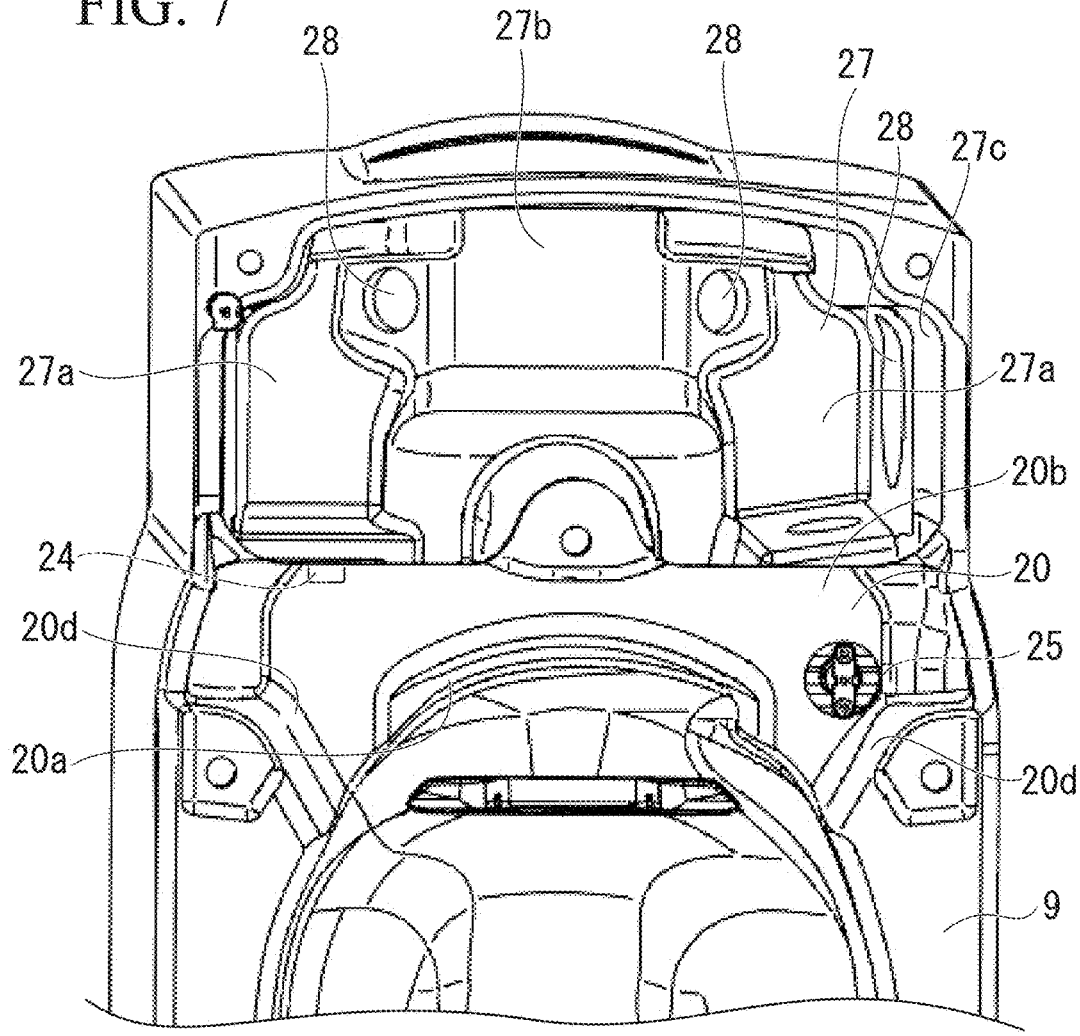
FIG. 7 is a plan view of the main portion of the toilet main body from which the base plate is removed.

Next, a flush toilet 1A according to a second embodiment of the present invention will be described based on FIGS. 6 to 8. In the second embodiment as well, the flush toilet 1A shares a basic structure with the flush toilet 1 according to the first embodiment. The flush toilet 1A according to the second embodiment is a type being installed, for example, on the floor surface of the restroom space. In FIGS. 6 and 7, a recessed portion 20 having a shape similar to that of the recessed portion 10 in the first embodiment is formed at the rear of the toilet bowl 9 of the toilet main body 2, and a base plate 23 is installed in an upper portion thereof.

In the base plate 23, similar to the first embodiment, the center of the front end portion of the base plate 23 facing the toilet bowl 9 is formed as a distal end low portion 23a which is formed to be lower than the periphery thereof, and a surrounding portion 23b on the periphery at the rear thereof is formed to be high by one stage via a step. The inflow ports 18a and 19a of the flow channels 18 and 19 in the first embodiment are not formed in both end portions of the distal end low portion 23a in the width direction, and erection portions 23c on both sides are in contact with front side walls 20d on both sides of the recessed portion 20 in the width direction. Then, a seal member (not shown) seals a space between the base plate 23 of the front end portion and the recessed portion 20.

In the present embodiment, a flow channel 26 for discharging water overflowing from the toilet bowl 9 is formed on the base plate 23, and the distal end low portion 23a at the center of a distal end of the base plate 23 serves as an inflow port of the flow channel 26. The arrow in FIG. 6 schematically depicts the flow channel and the configuration is not limited thereto.

In the base plate 23, discharging flow channel openings 24 and 25 for causing water flowing in the flow channel 26 to flow into the recessed portion 20 on a lower side are formed in both end portions of the surrounding portion 23b in the width direction. Therefore, the flow channel 26 on an upstream side is formed within a range from the distal end low portion 23a to the flow channel openings 24 and 25. An opening portion 23d for causing the components of the function unit 4 to be disposed while protruding downward in order to suppress the height of the product is formed on the rear side of the flow channel 26 of the base plate 23. The opening portion 23d through which the function unit 4 protrudes downward may form a protrusion portion sealing a bottom portion as in the first embodiment. In addition, it is preferable that the function unit 4 is installed in the surrounding portion 23b and the opening portion 23d higher than the distal end low portion 23a of the base plate 23.

The components of the function unit 4 are installed on the surrounding portion 23b of the base plate 23. However, even if a part of the components of the function unit 4 is flooded in the surrounding portion 23b on the flow channel 26, since the electric components and the like which are reluctant to be in contact with water are installed at a relatively high position on the surrounding portion 23b, the electric components and the like can be prevented from being flooded or being submerged.

In the present embodiment, the configuration is not limited to the flow channel openings 24 and 25 on the base plate 23. Water may flow into the recessed portion 20 through a different opening, and these may be a part of the flow channel 26. In the present embodiment, water supplied to the toilet bowl 9 flows in the flow channel 26 from the distal end low portion 23a of the base plate 23.

In the recessed portion 20 of the toilet main body 2 shown in FIG. 7, a low portion 20a, in which the distal end low portion 23a of the base plate 23 is installed, is formed at the front on the toilet bowl 9 side, a surrounding land portion 20b which is high in height by one stage is formed on the rear side thereof. A depression portion 27 protruding downward is formed at the rear of the surrounding land portion 20b. The depression portion 27 has a substantially bottomed box-shaped space, and a projected surface 27b swelling upward is formed at the center of a bottom portion 27a. A plurality of drainage openings 28 for draining are formed on the projected surface 27b and one side wall 27c side at positions higher than the bottom portion 27a. Therefore, a lower end of the function unit 4 extending from the opening portion 23d of the base plate 23 to a lower side is positioned on an upper side of the drainage openings 28.

In the present embodiment, for example, the flow channel openings 24 and 25 of the base plate 23 are installed above the surrounding land portion 20b of the recessed portion 20. Water which has flowed in the flow channel 26 of the base plate 23 and has fallen into the recessed portion 20 from the flow channel openings 24 and 25 flows and falls into the depression portion 27 after passing through the surrounding land portion 20b or directly.

If water is accumulated equal to or higher than a predetermined water level in the bottom portion 27a, the water falls down onto the floor surface via the drainage openings 28. Therefore, the flow channel 26 is formed by the distal end low portion 23a of the base plate 23, the flow channel openings 24 and 25 of the surrounding portion 23b, the surrounding land portion 20b of the recessed portion 20, the depression portion 27, and the drainage openings 28.

Figure 8:
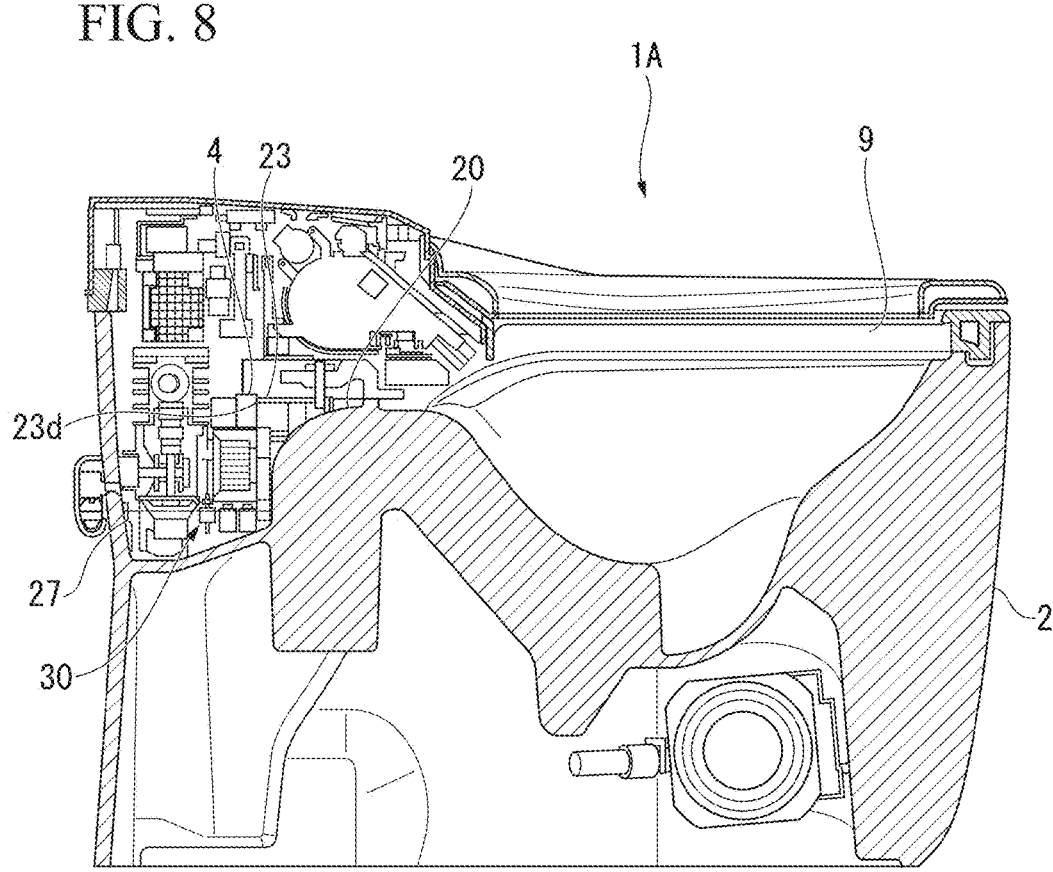
FIG. 8 is a longitudinal cross-sectional view of the main portion showing the flow channel through which water in a toilet bowl flows to a depression portion formed in a recessed portion of the toilet main body.

Then, in the longitudinal cross-sectional view of the toilet main body 2 shown in FIG. 8, for example, a float switch 30 including a float and an internal switch is suspended from the function unit 4 or the like in the vicinity of the bottom portion 27a inside the depression portion 27 of the recessed portion 20. If water that has flowed in the flow channel 26 is accumulated in the bottom portion 27a of the depression portion 27, the float switch 30 tilts due to buoyancy and switches between OFF and ON. Water stops being supplied to the inside of the toilet bowl 9 based on this signal.

Since the flush toilet 1A according to the second embodiment has the configuration as described above, when water is supplied to the inside of the toilet bowl 9 of the toilet main body 2 and filth is discharged, if the trap pipeline or the like of the toilet bowl 9 is clogged, the water level of the toilet bowl 9 rises. If the water level of the toilet bowl 9 rises to the distal end low portion 23a of the base plate 23, water flows in the flow channel 26 on the base plate 23 from the distal end low portion 23a and flows into the recessed portion 20 from the flow channel openings 24 and 25. Then, the water flows in the surrounding land portion 20b and falls into the depression portion 27 of the toilet main body 2. A tapered surface may be formed from the center toward both ends such that water flowing in the surrounding portion 23b of the base plate 23 reliably flows into the flow channel openings 24 and 25 at both ends in the width direction.

In addition, even if water flowing in the flow channel 26 on the base plate 23 comes into contact with a lower portion of the function unit 4, since the water on the base plate 23 falls into the recessed portion 20 via the flow channel openings 24 and 25, the depth of a water flow is shallow and a slight part of the functional components is flooded. Therefore, the electric components and the like, which are provided at a higher position on the base plate 23 and are reluctant to be in contact with water, are not flooded, so that the function of the function unit 4 is not adversely affected.

Then, if the water level of water accumulated in the bottom portion 27a of the depression portion 27 of the flow channel 26 rises to a certain degree, the float switch 30 suspended in the vicinity of the bottom portion 27a is immersed below the surface of the water and tilts due to buoyancy, the float switch 30 switches between ON and OFF to be detected, and water is caused to stop being supplied to the inside of the toilet bowl 9, via a control circuit (not shown).

Here, if the float switch 30 malfunctions or additional water in a bucket or the like is applied to the inside of the toilet bowl 9, the amount of water supplied to the inside of the depression portion 27 of the recessed portion 20 via the flow channel 26 increases, so that the water level rises. In this case as well, the water falls onto the floor surface through the drainage openings 28 provided on the projected surface 27b or the side wall 27c of the depression portion 27. Therefore, the function unit 4 positioned above the drainage openings 28 of the depression portion 27 can be prevented from being flooded.

The base plate 3 may be configured to be able to be detached and cleaned in a case where water which overflows from the toilet bowl 9 flows in the flow channel 26 so that the recessed portion 20 or the depression portion 27 is contaminated.

As described above, according to the flush toilet 1A according to the second embodiment, even if the trap pipeline or the like is clogged and the water level inside the toilet bowl 9 rises at the time of draining of the toilet bowl 9, waste water is accumulated in the depression portion 27 of the recessed portion 20 from the distal end low portion 23a of the base plate 23 through the flow channel 26 and the flow channel openings 24 and 25 on the base plate 23, so that the water is prevented from overflowing from the toilet bowl 9. Moreover, since water can stop being supplied to the inside of the toilet bowl 9 by the float switch 30 before the water accumulated in the depression portion 27 overflows from the drainage openings 28, the water can be prevented from flowing and falling onto the floor surface.

In addition, even if water falling into the depression portion 27 further increases due to a malfunction of the float switch 30, additionally poured water, or the like, since water exceeding a predetermined water level can be caused to fall onto the floor surface through the drainage openings 28, the function unit 4 provided inside the depression portion 27 can be prevented from being flooded or being submerged.

In addition, even if the water level inside the toilet bowl 9 rises and water flows in the flow channel 26 on the base plate 23 through the distal end low portion 23a, and even if a part of the function unit 4 installed on the base plate 23 comes into contact with the water due to the configuration in which water falls into the recessed portion 20 from the flow channel openings 24 and 25, the amount of the water is slight, so that the function unit 4 can be prevented from being contaminated or being submerged.

In addition, the base plate 23, in which the function unit 4 is installed, is installed inside the recessed portion 20 of the toilet main body 2, and a part of the function unit 4 on the base plate 23 is installed inside the depression portion 27 through the opening portion 23d. Therefore, the product including the function unit 4 can be lowered in height and can be compactly formed.

In the flush toilet 1 according to the first embodiment described above, the function unit 4 or the like is protected by causing water flowing in the flow channels 18 and 19 between the recessed portion 10 and the base plate 3 from the toilet bowl 9 to fall onto the floor surface. However, a water detection sensor or a water sensing sensor for detecting water may be installed in the flow channels 18 and 19 on the recessed portion 10 or the like. If the water detection sensor or the water sensing sensor detects water on the flow channels 18 and 19 and the water stops being supplied to the inside of the toilet bowl 9, waste water falling onto the floor surface can be prevented or reduced.

In addition, the flow channels 18 and 19 and the outflow ports 18b and 19b thereof are provided in the gap between the hole portions 11 and 12 of the toilet main body 2 and the protrusion portions 13 and 14 of the base plate 3, the protrusion portions 13 and 14 are not necessarily provided as long as there are the hole portions 11 and 12.

In addition, in the flush toilet 1A according to the second embodiment, the drainage openings 28 are provided in the depression portion 27 provided at the rear of the recessed portion 10 of the toilet main body 2. However, water from the toilet bowl 9 can be stopped within the depression portion 27 by the float switch 30, so that the drainage openings 28 may be omitted.

The water detection sensor, the water sensing sensor, the float switch 30, and the like are included in the sensors for detecting the water level.

In addition, in the first embodiment of the present invention, water inside the toilet bowl 9 is discharged out of the bowl from the flow channels 18 and 19 between the recessed portion 10 and the base plate 3 of the toilet main body 2. In the second embodiment, water is discharged out of the bowl from the flow channel 26 provided on the upper surface and the recessed portion 20 of the base plate 23. However, in the present invention, the flow channel for discharging water, of which the water level rises inside the toilet bowl 9, out of the bowl need only be able to be installed in any location between the recessed portions 10 and 20 of the toilet main body 2 and the function unit 4. At this time, as long as the electric components and the like of the function unit 4 are not flooded, submerged, or the like, water may come into contact with the lower portion of a part of the function unit 4.

In addition, in the second embodiment, in place of the flow channel 26 provided in the base plate 23, the flow channels 18 and 19 shown in the first embodiment may be formed between the recessed portion 20 and the base plate 23 and may communicate with the depression portion 27 in place of the hole portions 11 and 12. In this case, the function unit 4 is not flooded.

In addition, in each of the embodiments described above, the base plates 3 and 23 are installed inside the recessed portions 10 and 20 provided at the rear of the toilet bowl 9 of the toilet main body 2. However, the recessed portions 10 and 20 are not necessarily formed, and the base plates 3 and 23 may be installed on a flat surface of the toilet main body 2.

The base plates 3 and 23 are included in a base portion.

The present invention provides a flush toilet in which in a case where a toilet bowl of a toilet main body is clogged and water inside thereof overflows, the overflowing water is discharged via a flow channel provided in the toilet main body and a function unit provided on an upper surface of the toilet main body is prevented from being flooded.

REFERENCE SIGNS LIST 1, 1A flush toilet
2 toilet main body
3, 23 base plate
4 function unit
9 toilet bowl
10, 20 recessed portion
11, 12 hole portion
13, 14 protrusion portion
18, 19, 26 flow channel
18a, 19a inflow port
18b, 19b outflow port
24, 25 flow channel opening
27 depression portion
28 drainage opening
30 float switch

What is claimed is:
1. A flush toilet comprising:
a toilet main body;
a base portion which is provided on an upper surface of the toilet main body and in which a function unit is installed; and
a flow channel which is provided between the toilet main body and the function unit and discharges water that overflows from a toilet bowl of the toilet main body;
wherein the flow channel is formed in the base portion and communicates with the toilet main body via a flow channel opening formed in the base portion.
2. The flush toilet of claim 1,
wherein the flow channel is formed between the toilet main body and the base portion.
3. The flush toilet of claim 1,
wherein a recessed portion is formed on the upper surface on which the base portion of the toilet main body is installed, and the flow channel is formed in the recessed portion.
4. The flush toilet of claim 3,
wherein a sensor detecting water is installed in the flow channel of the recessed portion.
5. The flush toilet of claim 1,
wherein the flow channel communicates with a hole portion which is formed in the toilet main body and is open downward.
6. The flush toilet of claim 1,
wherein the flow channel communicates with a depression portion which is formed to protrude downward from the toilet main body, and a sensor detecting water is installed in the depression portion.
7. The flush toilet of claim 6,
wherein a drainage opening is provided at a position lower than the function unit in height in the depression portion.

* * * * *